US005785734A

United States Patent [19]

Gutknecht

[11] Patent Number: 5,785,734
[45] Date of Patent: Jul. 28, 1998

[54] RESIDUE AND WASTE TREATMENT PROCESS

[76] Inventor: Max Gutknecht, Im Eggli 10/Auf Pünten, CH-8525 Niederneunforn, Switzerland

[21] Appl. No.: 505,359

[22] PCT Filed: Dec. 27, 1994

[86] PCT No.: PCT/EP94/04306

§ 371 Date: Oct. 12, 1995

§ 102(e) Date: Oct. 12, 1995

[87] PCT Pub. No.: WO95/17980

PCT Pub. Date: Jul. 6, 1995

[30] Foreign Application Priority Data

Dec. 31, 1993 [DE] Germany ............... 43 45 074.1
Feb. 7, 1994 [DE] Germany ............... 44 03 746.5

[51] Int. Cl.$^6$ ............... C22B 9/00; B09B 3/00; F23G 5/02
[52] U.S. Cl. ............... 75/581; 110/235; 110/346
[58] Field of Search ............... 75/500, 577, 581, 75/459; 110/235, 255, 346, 246

[56] References Cited

U.S. PATENT DOCUMENTS

| 4,089,277 | 5/1978 | Paul | 110/204 |
|---|---|---|---|
| 4,361,100 | 11/1982 | Hinger | 110/238 |
| 4,477,257 | 10/1984 | Koppelman et al. | 44/30 |
| 4,599,002 | 7/1986 | Gutknecht | 366/85 |
| 4,772,430 | 9/1988 | Sauda et al. | 252/628 |
| 4,951,887 | 8/1990 | Gutknecht | 241/260.1 |
| 5,266,085 | 11/1993 | McMahon et al. | 48/197 |
| 5,347,938 | 9/1994 | Takazawa | 110/346 |
| 5,387,267 | 2/1995 | Warf et al. | 44/589 |
| 5,389,114 | 2/1995 | Forder | 44/552 |
| 5,396,850 | 3/1995 | Conochie et al. | 110/346 |
| 5,443,572 | 8/1995 | Wilkinson et al. | 266/46 |
| 5,445,088 | 8/1995 | Daugherty et al. | 110/346 |

*Primary Examiner*—David A. Simmons
*Assistant Examiner*—J. A. Lorengo
*Attorney, Agent, or Firm*—Bachman & LaPointe, P.C.

[57] ABSTRACT

In the case of a process for treating residues and waste materials, in particular household, commercial, and industrial trash, in a first step in the process these materials are treated thermomechanically, for example in a worm extruder, that is, in particular, heated, separated into fibers, and brought to a solid state. Then the materials in the solid state are separated selectively and subjected to a further recycling treatment.

8 Claims, No Drawings

RESIDUE AND WASTE TREATMENT PROCESS

This application is a continuation and 371 of PCT/EP94/04306 filed Dec. 27, 1994.

BACKGROUND OF THE INVENTION

The invention concerns a process for the treatment of residues and waste materials, in particular household, commercial, and industrial trash. In a first step in the process these materials are treated thermomechanically, for example in a worm extruder, that is, in particular, heated, separated into fibers, and brought into a solid state.

The treatment of residues and waste materials creates considerable problems at the present time. In spite of investments of billions, up to now it has not been possible to guarantee trash disposal and, in particular, to relieve the load on the dumps. Above all, recycling creates difficulties. In this case it is to be considered that the residues and waste material, and in particular here the light fractions, take up a considerable volume, which is difficult to dump. Those materials, as mixtures of materials, which no longer contain metals, usually are considered to be light fractions.

The light fraction is, as the name suggests, light and does not sink, so that the dumps become unstable. They constitute a latent fire danger, and as a rule contain very many hazardous substances, such as, for example, PCB's. Therefore a relatively thin layer of such residues and waste materials in dumps, even if they are shredded, has to be covered with earth. The expense for this is enormous, further the hazardous materials are retained in the shredded material. Today this means that in some countries dumping cannot be carried out at all, rather the residues and waste materials have to be shipped to other countries. Of course, this is a poor solution.

In order to be able to achieve at least a decrease in volume and a reduction of hazardous materials, processes and equipment for the thermomechanical treatment of residues and waste materials are described in PCTCH 83/00059 and Swiss patent application 4 778/87-7. Here a worm extruder is used to press the liquid out of the residues and waste materials and remove it by suction. The material to be crushed is broken up, i.e. separated into fibers, and the cell walls of the organic materials are opened. This separation into fibers makes it possible to stabilize the residues and waste materials into a solid form, such as, for example, fibers, granulates, briquettes, powders, or the like after the dehydration.

The final form above all depends on the composition of the residues and waste materials to be processed. For example, if an automobile is to be processed, the residues and waste materials are composed of textiles, plastic, metal, glass, etc. As a result of the above-mentioned thermomechanical treatment a briquette emerges from the worm extruder a briquette which contains metal residues and plastic particles which are connected together by means of plastic and textile fibers.

What is important here is that a significant volume reduction takes place as a result of the thermomechanical treatment, and, in particular, as a result of the dehydration. The solid materials which are made stable in this way can be stored in dumps or temporarily stored.

In the case of the thermomechanical process the residues and waste materials to be processed are heated above 120° C. In this way some troublesome materials, in particular PVC, are evaporated, so that these troublesome materials can be removed in the gaseous state right during the thermomechanical preparation. This gas is subjected to a purification or, for example, destroyed by high temperature.

SUMMARY OF THE INVENTION

The task of the present invention is to improve the above-mentioned process so that a simpler recycling is possible as a result of a further processing in the solid state.

The fact that the material in solid state is fed into a combustion chamber, in particular a blast furnace, leads to the solution of this task.

That is, the material in solid state is pushed out of the extruder into a combustion chamber. Of course, preferably the material in solid state first is subjected to a selective separation and then sent on for further recycling.

DETAILED DESCRIPTION OF PREFERRED EMBODIMENTS

As mentioned above, depending on the initial material, the solid form can consist of fibers, granulates, briquettes, powders, fused products or semi-fused products. In this case, of course, if only one initial material is used, no selective separation has to take place. However, this is the least frequent case. Above all the present invention refers to mixed products, such as, in particular, a light fraction from an automobile shredder or mixed plastics. However, the invention is not limited to that. The selective separation is to separate different materials of a mixed fraction from one another. For example, this can take place by means of screening, sifting, in a cyclone separator, or the like.

If the solid state already is granulated material, powder, or fibers, the selective separation can take place directly after the thermomechanical treatment. Of course, this is regularly not the case where the solid state exists as a briquette, fused product, or semi-fused product after the thermomechanical treatment. Here, in particular, this solid form is broken up again before the selective separation. In particular, a metal fraction can be separated from a light fraction in this way. Of course, both fractions are present in the granulated or powdered form after the crushing.

A further recycling of this solid form takes place now, the solid form being blown directly into a reaction chamber as a fuel with or without additives. As for a further recycling, blowing the broken-up material via lances into a liquid phase of a blast furnace has proven to be particularly favorable.

A fuel which contains an immense energy potential has been created by the selective separation and crushing. Hazardous materials, which still are found in the solid form, are eliminated directly at the temperature of around 2,000° C. which prevails in the blast furnace. Above all this is also true of dioxins, which are produced during the transition through around 450° C. and are destroyed at around 1,200° C. An analogous situation also obtains for the cooling phase.

I claim:

1. A process for treating residues and waste materials, which comprises:

thermomechanically heating a material which is at least one of residues and waste materials, and separating the material into fibers with a worm extruder, thereby providing a stabilized, solid-state material;

crushing the stabilized, solid-state material to a grain size of 1–10 mm to provide a mixture of different materials;

separating the different materials from the crushed mixture of materials; and blowing the separated different materials directly into a reaction chamber.

2. A process according to claim 1, including the step of separating the different materials from the crushed mixture by sifting.

3. A process according to claim 1, wherein the different materials are blown into a reaction chamber with additives.

4. A process according to claim 1, wherein the different materials are blown into a reaction chamber without additives.

5. A process according to claim 1, including the step of introducing the different materials into a liquid phase of a blast furnace.

6. A process according to claim 5, wherein said different materials are introduced via lances.

7. A process according to claim 1, wherein said different materials are treated in said reaction chamber at a temperature of at least around 2000° C.

8. A process according to claim 1, wherein the different materials are burned in said reaction chamber.

* * * * *